United States Patent [19]
Kotani et al.

[11] Patent Number: 5,148,211
[45] Date of Patent: Sep. 15, 1992

[54] STABILIZED RANGE FINDER FOR USE WITH AN ELECTRONICALLY CONTROLLED CAMERA

[75] Inventors: Takaaki Kotani; Seiji Takada, both of Tokyo; Shigenori Goto; Tatsuo Saito, both of Saitama, all of Japan

[73] Assignee: Fuji Photo Film Co., Ltd., Kanagawa, Japan

[21] Appl. No.: 600,821

[22] Filed: Oct. 22, 1990

[30] Foreign Application Priority Data

| Oct. 20, 1989 | [JP] | Japan | 1-274646 |
| Oct. 20, 1989 | [JP] | Japan | 1-274647 |
| Oct. 20, 1989 | [JP] | Japan | 1-274664 |
| Jan. 22, 1990 | [JP] | Japan | 2-12312 |
| Mar. 27, 1990 | [JP] | Japan | 2-78345 |
| Mar. 27, 1990 | [JP] | Japan | 2-78346 |

[51] Int. Cl.$^5$ .................. G03B 13/36; G01C 3/08
[52] U.S. Cl. ........................... 354/403; 356/1
[58] Field of Search .............. 354/403, 412; 356/1,4

[56] References Cited

U.S. PATENT DOCUMENTS

| 4,274,735 | 6/1981 | Tamura et al. | 354/403 X |
| 4,350,418 | 9/1982 | Taguchi et al. | 354/403 |
| 4,401,373 | 8/1983 | Nakai | 354/412 |
| 4,909,624 | 3/1990 | Tsuru et al. | 354/403 X |
| 4,958,183 | 9/1990 | Akada et al. | 354/412 |
| 4,962,400 | 10/1990 | Otani et al. | 354/403 X |
| 4,983,033 | 1/1991 | Suzuki | 354/403 X |

FOREIGN PATENT DOCUMENTS

| 57-158508 | 9/1982 | Japan |
| 57-182112 | 11/1982 | Japan |
| 59-90012 | 5/1984 | Japan |

Primary Examiner—W. B. Perkey
Attorney, Agent, or Firm—Young & Thompson

[57] ABSTRACT

A range finding device having a plurality of LEDs for projecting toward a scene to be photographed a plurality of spot beams of light disposed in a horizontal line, and a PSD for receiving light reflected from the object. Two channel signals from the PSD are amplified by gain control amplifiers and converted into digital signals. The two channel digital signals are obtained for each LED, and the ratio between the two digital signals is used for calculating a distance datum. Of a plurality of distance data obtained for respective LEDs, an optimum one is selected. For the calculation of a distance datum, there is used a microcomputer which controls an image taking sequence. The gain of the gain control amplifier is automatically adjusted by the measured data obtained in accordance with pulsed light emitted during the initial period of driving the LED. Digital signals obtained prior to the light emission of the LED are used for calculating an offset correction value. Each LED emits a pulsed light beam at a predetermined interval. An average value of digital signals for the pulsed light beams is used for calculating a distance datum. Several pulsed light beams during the initial period are not used for range finding or gain control. If the gain of the gain control amplifier is not proper, the range finding is interrupted and a distance datum specific to the then-existing gain value is used.

12 Claims, 12 Drawing Sheets

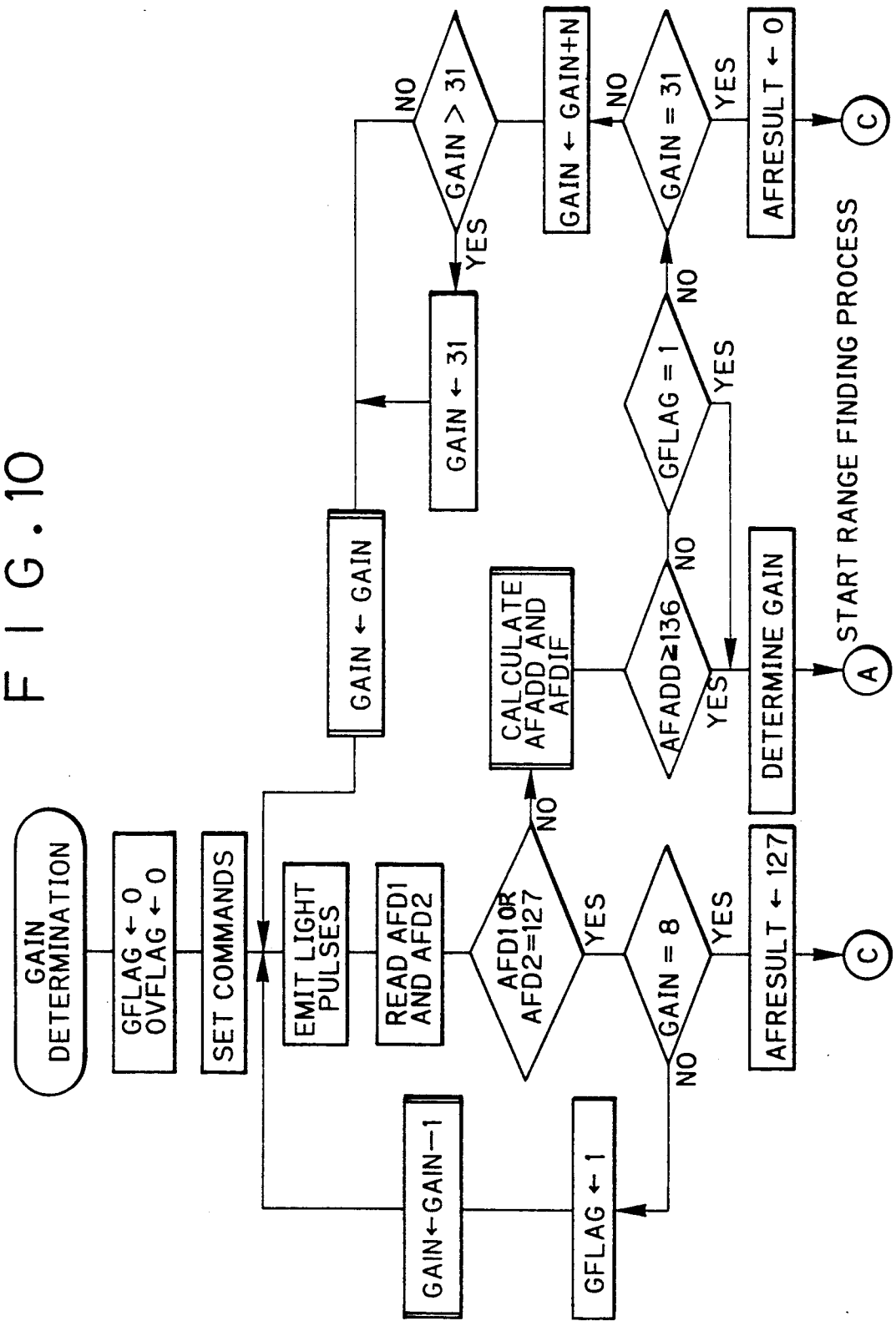

FIG. 13
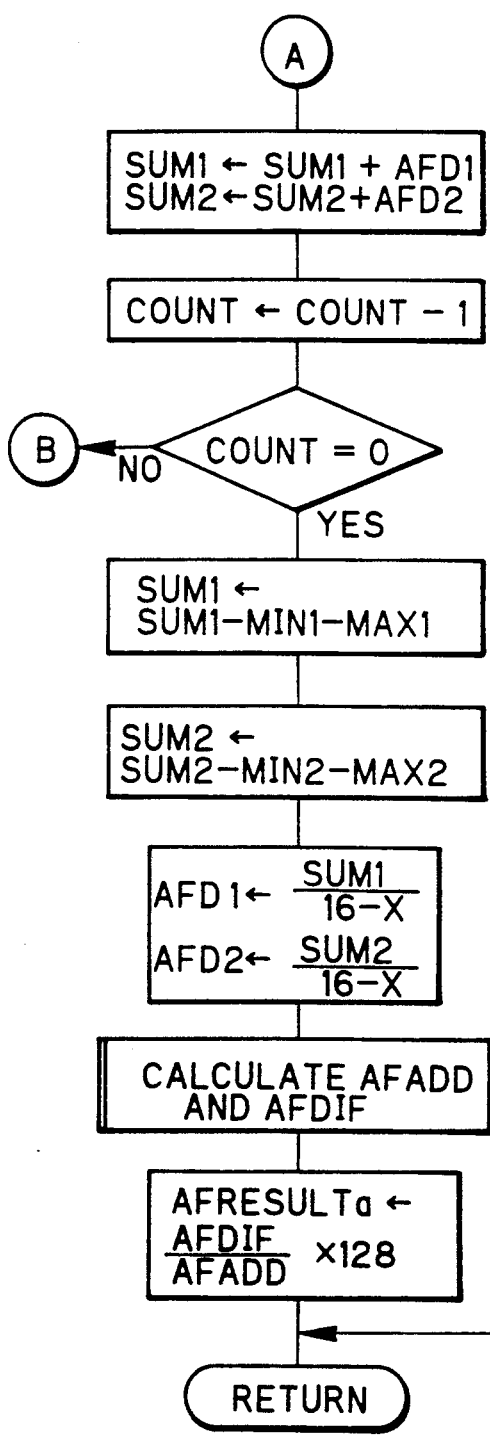
FIG. 11
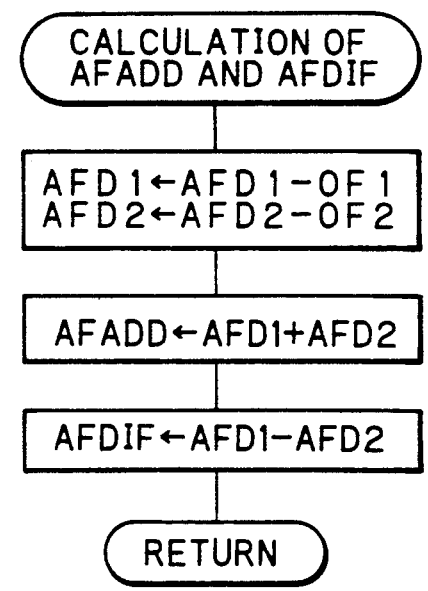
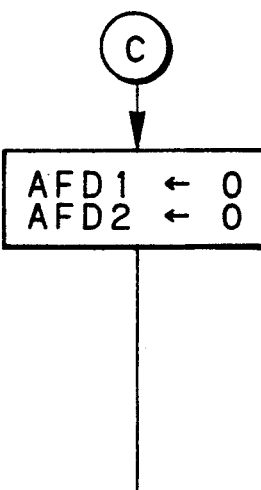

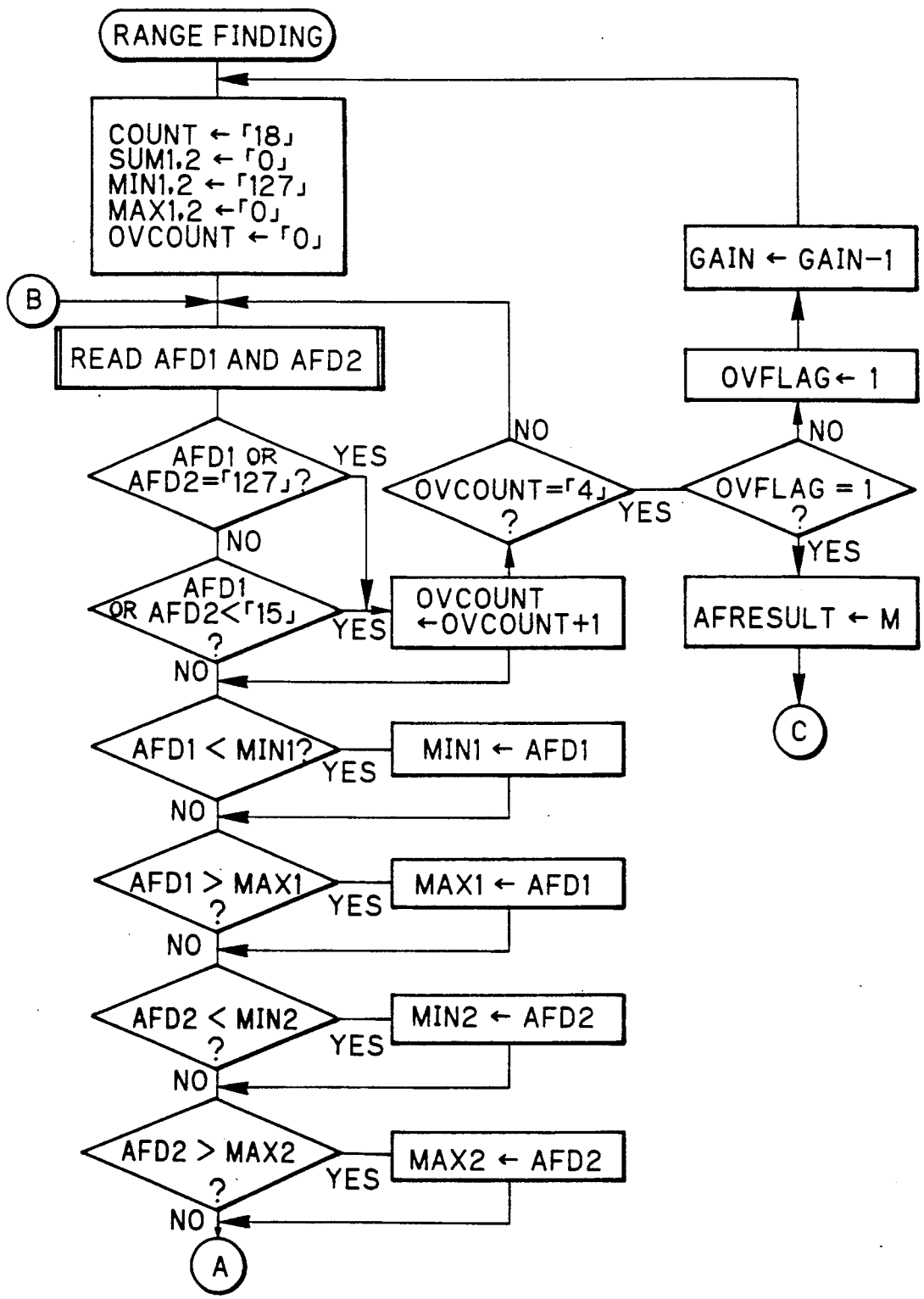
F I G . 12

STABILIZED RANGE FINDER FOR USE WITH AN ELECTRONICALLY CONTROLLED CAMERA

FIELD OF THE INVENTION

The present invention relates to a range finding device of a camera for measuring the distance to an object by means of optical triangulation, and more particularly to a range finding device for detecting the distances to a plurality of objects in a photographic scene by projecting a predetermined number of pulsed light beams to the respective objects.

BACKGROUND OF THE INVENTION

Active-type range finding devices are widely used with recent compact cameras. A range finding device of this type has a light projector for projecting a spot of light or a line of light toward an object, and a light receiver for receiving light reflected from the object. The position of the reflected light incident upon the light receiver changes with object distance so that the object distance can be measured by detecting the incident position of the reflected light. As a light source of the light projector, an LED (light emitting diode) is mainly used which emits nearinfrared light from its p-n junction. As a light receiving element of the light receiver, a semi-conductor PSD (position sensitive detector) is often used which has a filter mounted on the light receiving surface thereof for transmission of near-infrared light. A PSD has two output terminals each outputting a current corresponding to the intensity and position of the incident light. By calculating the ratio between these two channel currents or voltages, a signal dependent only upon the incident position of near-infrared light can be obtained. The intensity of a spot of light reflected from an object changes with the object distance. Thus, the intensities of two signals outputted from a PSD may sometimes become too large or small, which reduces measurement precision. For this reason, a gain control amplifier is provided for each channel to obtain a signal having an adequate dynamic range. The gain of each gain control amplifier is automatically adjusted by feeding back a portion of each output signal of the PSD.

In a conventional range finding device using a PSD such as described in Japanese Patent Laid-Open Publs. Nos. 57-158508 and 57-182112, near-infrared light from an LED is applied to an object, and two channel currents outputted from a PSD are converted into corresponding voltages. The two channel voltages are amplified by corresponding gain control amplifiers and thereafter logarithmically compressed. Using the difference between the two logarithmically compressed channel signals, there is obtained the position of the light incident upon the PSD that corresponds to the object distance. There is disclosed in Japanese Patent Laid-Open Publ. No. 59-90012 a simple method of calculating the ratio between two channel analog signals outputted from two gain control amplifiers by using the charge-discharge time of a capacitor. There is also proposed a method of calculating the ratio between two signals and A/D converting by using one of the two signals as a reference for A/D conversion. There is also known a method of improving the precision of range finding by repeating a plurality of measurements and determining the position of incident light representative of object distance by using an average value of the plurality of obtained measurement data.

The above-described techniques have the following disadvantages. In the technique using logarithmic compression, it becomes necessary to use a logarithmic amplifier, differential amplifier, logarithmic expansion amplifier and the like for each channel, resulting in a large circuit. In addition, the S/N ratio of a logarithmic amplifier is worse than that of a linear amplifier so that it is difficult to improve the precision of range finding. For the technique using the charge/discharge time of a capacitor, although the circuit can be made smaller than when using a logarithmic amplifier, there are required relatively complicated division circuits for obtaining the ratio between the two channel signals.

A PSD receives not only near-infrared light reflected from an object but also unnecessary ambient light from the photographic scene. There is known a method of avoiding the influence of unnecessary ambient light, wherein a pulsed spot of light having a predetermined frequency is generated by an LED for example, and two channel analog signals are passed through high-pass filters to derive only the signal components having the same frequency. With this method, however, it is difficult to remove noise components completely. In addition, for an object at a great distance, each channel signal contains large unnecessary light components, thereby lowering the precision of measurement. This measurement precision is also lowered by the influence of components present in signal processing circuits such as gain control amplifiers.

Each channel signal for an object having a high reflectivity and which is located at a near distance becomes too large so that even if the gain of the gain control amplifier is set at a minimum value, the channel signal cannot be adjusted within an adequate output dynamic range. For such an object, even if near-infrared light is projected after a gain adjustment toward an object for range finding, measurement with good precision is not possible. Even after the gain of a gain control amplifier has been adjusted properly for an object, if the object should move, the near-infrared light beam may reach a different object having a different reflectivity. Also in such a case, it often occurs that the output signal from the gain control amplifier becomes too large so that the proper output dynamic range cannot be obtained. To solve this problem, the gain of the gain control amplifier should be adjusted again and range finding carried out thereafter. In this case, however, if the reflection factor changes during this period, only the gain adjustment must be repeated resulting in the range finding being disabled. Particularly in the case wherein a plurality of range finding operations are repeated after the gain is adjusted, the average value of the plurality of obtained measurement data is used in determining the incident light position in order to improve the range finding precision, there is a good possibility that each channel signal will become excessive during such measurements, again resulting in range finding being disabled. There is known a camera which automatically moves the taking lens to a pan focus position in such an unsuitable state of range finding. But with a camera of this type, an out-of focus exposure is likely to be made of an object at a near distance.

An LED for emitting light of long wavelength, such as a near-infrared light, has a negative temperature-light output characteristic. Thus, the amount of emitted light at the start of the period of driving the LED is less than that in the stable state. It is therefore impossible to set an optimum gain for a range finding device of the type in which an LED is driven a number of times and the gain of a gain control amplifier is determined by using light emission from the outset and thereafter a distance measurement is made. In this case, because of improper gain, there will be the difficulty that the output signal from the gain control amplifier for each channel does not reach an expected level at the outset of range finding. It is possible to judge object distance to be infinite if the output signal from a PSD is null or extremely small. However, if such a judgment is made when the amount of LED light emission is small, then an object which is actually within a detectable range if to be at infinity, which of course is an erroneous measurement.

Many recent compact cameras have microcomputers built therein. With such cameras, a microcomputer executes a photographing sequence to control range finding, photometry, exposure and film transport, upon actuation of a shutter button. During this sequence, the microcomputer collects data from various circuit portions of a range finding device, photometry device, film transport device and the like. During the photographing sequence, the microcomputer can reliably retrieve data from various circuit portions of the photometry device, film transport device and the like, except the measured data from the range finding device, because such data has a wide dynamic range. In consideration of this circumstance, conventionally an active-type range finding device has been provided with a function to adjust the intensity of nearinfrared light to be emitted by an LED to a proper value, a function to amplify the output signal from a PSD to a proper level, a function to measure a plurality of points in a photographic scene and select a distance datum at an optimum point with priority over other points, and other functions. Therefore, it is inevitable that the circuit becomes large in size and the manufacturing cost becomes high.

OBJECTS OF THE INVENTION

It is therefore a principal object of the present invention to provide a range finding device capable of measuring object distance with high precision.

It is another object of the present invention to provide a range finding device capable of simplifying the signal processing systems.

It is a further object of this invention to provide a range finding device which allows measuring object distance under as various circumstances as possible without superfluous measurements even if an output signal from a gain control amplifier changes.

It is a still further object of this invention to provide a range finding device of a reduced circuit size for lowering the cost by making a microcomputer built into a camera perform a part of the function of the range finding device.

Finally, it is an object of this invention to provide a range finding device capable of preventing erroneous measurement otherwise caused by the start-up characteristics of a light emitting element.

SUMMARY OF THE INVENTION

The above and other objects and advantages of this invention can be achieved by amplifying in a linear amplifier system two channel signals outputted as analog signals from a light receiving element, converting the analog channel signals into digital signals, and digitally calculating the ratio between the two channel digital signals. This circuit arrangement is advantageous in that the burden on an amplifier system connected to the light receiving element can be reduced and the circuit structure can be simplified. Furthermore, a division operation for obtaining an incident light position is carried out after A/D conversion so that distance data can be obtained with high precision. In addition, this digital calculation can be performed by a general-purpose microcomputer which supervises the image taking sequence of a camera, without raising manufacturing cost. It is possible to detect a distance datum as an average value of a plurality of data obtained by emitting a plurality of pulsed light beams, instead of a distance datum obtained based on a single pulsed light beam.

According to a preferred embodiment of this invention, as the light source for the light projector, a number M of LEDs (M is an integer) are used, each emitting near-infrared light. As a light receiving element of a light receiver, a PSD is used which is provided with a filter mounted on the light receiving surface thereof for transmitting near-infrared light. The light projector projects a corresponding number M of near-infrared spot beams along a line extending horizontally in a photographic scene. The LEDs are sequentially driven each for a predetermined time period. Each LED emits $N_A$ cycles of pulsed light beams per the predetermined time period. The first $N_B$ pulsed light beams of the $N_A$ pulse light beams are used for the gain control of an automatic gain control amplifier, the other $(N_A-N_B)$ pulsed light beams are used for measuring object distance. While the $(N_A-N_B)$ pulsed light beams are applied to the object whose distance is to be measured, two channel signals derived from two output terminals of a PSD are amplified by automatic gain control amplifiers and converted by A/D converters into digital signals. Thus, $(N_A-N_B)$ measured data are obtained for each channel. Representing the average values of measured data for the two channels as values Y1 and Y2, the ratio between these average values Y1 and Y2 is used to calculate the distance data corresponding to the incident position of reflected light, i.e., the object distance. A distance datum is calculated for each LED, so that a total of N distance data are obtained. An optimum distance datum is selected from the N distance data in accordance with a priority order such as a near distance priority order, a frame central area priority order or the like. The position of the taking lens is determined in accordance with the selected distance datum. In this embodiment, the number $N_A$ may for example be "2" and the number $N_B$ may for example be "1".

According to another preferred embodiment of this invention, in accordance with a correlation between the gain value and a digital signal obtained by projecting $N_B$ pulsed light beams onto an object, a new gain value is calculated to adjust the two channel signals to optimum values. In this embodiment, as compared with a conventional range finding device which adjusts the gain of a gain control amplifier by using an output signal from a logarithmic amplifier, the circuit structure can be simplified,. Furthermore, since the circuit is free from the influence of noise, a measured datum has a good S/N ratio.

According to a further preferred embodiment of this invention, before or after light is projected for range finding, digital signals are picked up and used as offset correction values, which are subtracted from a digital signal, obtained while the light beam is projected onto an object for range finding. With this arrangement, it becomes possible to correct the offsets of the whole signal processing system and to eliminate the influence of ambient light. In this embodiment, a specific offset correction circuit is not used, so that the structure of the range finding device is simplified.

According to a still further preferred embodiment of this invention, if, a signal does not have a proper output dynamic range even through the gain of a gain control amplifier is adjusted, a predetermined distance datum specific to the gain value at that time is provided. In the range finding device of the type wherein a plurality of distance measurements are carried out after determining the gain of a gain control amplifier and the plurality of obtained measurement data are used in determining object distance, even during range finding operations, monitoring is performed to determine whether an output signal from the gain control amplifier is within a proper output dynamic range. If the number of such output signals that are not included within the proper output dynamic range is smaller than a predetermined number, a predetermined number of range finding operations is allowed to continue at the same gain value. If the number of output signals not included within the proper output dynamic range reaches the predetermined number after a plurality of measurements, the gain of the gain control amplifier is adjusted again to execute the predetermined number of range finding operations once more. If gain adjustment becomes necessary for the second time, the range finding operation is terminated and a distance datum specific to the gain value at that time is provided. According to this embodiment, if the gain of the gain control amplifier cannot be set to a proper value, the distance datum specific to the gain value then existing is provided so that range finding is not disabled and it becomes possible to focus properly on an object to be photographed, with relatively high probability of sharp focus. Furthermore, even if the output signal obtained upon each distance measurement operation is outside of a proper dynamic range, the distance measurement operation continues so long as the number of such output signals is small. Accordingly, superfluous gain adjustment is dispensed with, thereby to allow rational range finding. Although a plurality of distance measurements takes place after such gain readjustment, if the number of output signals not included within the proper dynamic range becomes large, the distance datum specific to the gain value extent at that time is provided. For this reason, even if the light reflected from an object is unstable, the problem of repetitive gain adjustment and range finding can be solved, so as rapidly to obtain a distance datum to be used for focusing.

According to another preferred embodiment of this invention, pulsed light beams, emitted before the amount of light emitted from a light source such as an LED becomes stable, are disregarded for purposes of range finding. In other words, distance measurement is allowed to start only after a predetermined number of pulsed light beams has been emitted. Accordingly, correct distance measurement is enabled by ignoring the light amount fluctuation upon start-up of a light emitting element.

According to another preferred embodiment of this invention, the range finding device has a shift register into which command data from a microcomputer are written via a series I/O port. The range finding device performs distance measurement in accordance with command data stored in the shift register at predetermined bit positions. The measured data are supplied to the microcomputer which in turn calculates distance data. In this embodiment, the gain control process and the calculation process for obtaining distance data, which have heretofore imposed a heavy burden on conventional range finding devices, are performed by the microcomputer controlling the camera operation sequence. Thus, the range finding device can be simplified and made compact. In addition, such processes can be carried out merely by changing the programs of the microcomputer, resulting in low manufacturing cost.

BRIEF DESCRIPTION OF THE DRAWINGS

The above and other objects and advantages of the present invention will become apparent to those skilled in this art from the following detailed description of the invention when read in connection with the accompanying drawings, in which:

FIG. 10 is a flow chart illustrating the procedure of determining a gain;

FIG. 11 is a flow chart illustrating the procedure of calculating an addition measurement data and a subtraction measurement data;

FIGS. 12 and 13 are flow charts illustrating the procedure of calculating distance data.

DETAILED DESCRIPTION OF THE INVENTION

Figure 1:
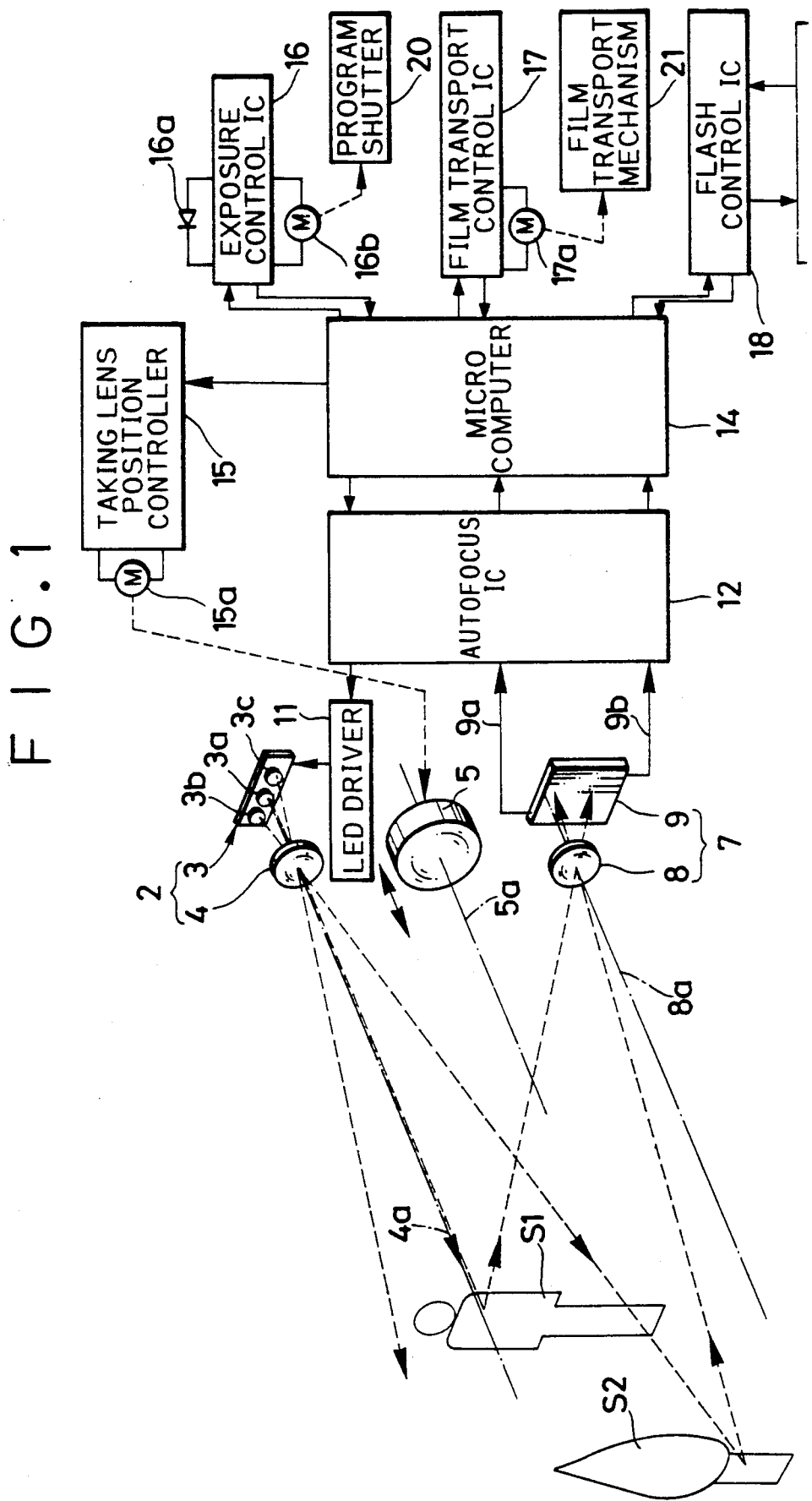
FIG. 1 is a diagram explaining the overall configuration of an embodiment of the range finding device according to the present invention.

Referring to FIG. 1 showing an active-type range finding device, a light projector 2 comprises a light source 3 and a light projecting lens 4. The optical axis 4a of the light projecting lens 4 is substantially parallel to the optical axis 5a of a taking lens 5. The light source 3 has three LEDs (light emitting diodes) 3a, 3b and 3c for emitting near-infrared light. These LEDs 3a, 3b and 3c are disposed horizontally on a camera body (not shown), the middle LED 3a being positioned on the optical axis 4a and the LEDs 3b and 3c being positioned on the right and left of the LED 3a. Spot light beams are sequentially projected toward three areas disposed laterally in a photographic scene.

A light receiver 7 comprises a light receiving lens 8 and a PSD 9. The optical axis 8a of the light receiving lens 8 is substantially parallel to the optical, axis 5a of the taking lens 5. The PSD 9 has a filter (not shown) mounted on its light receiving surface for passing only near-infrared light. Currents corresponding to the amount and incident position of the incident light passing through the filter are outputted from output terminals 9a and 9b of the PSD 9. The less the object distance, the nearer to the output terminal 9b is the light reflected from the object incident upon the light receiving surface of the PSD 9. The nearer an object, the higher the intensity of the reflected light, so that the absolute values of the currents from the output terminals 9a and 9b become large. However, a signal dependent upon only the incident position can be obtained by calculating a sum-to-difference ratio of the output currents, irrespective of the intensity of the reflected light. The incident position corresponds to the object distance, and this object distance can be obtained based on two channel currents.

Light emission of the LEDs 3a to 3c is controlled by a signal supplied via an LED driver 11 from an autofocus IC 12. This autofocus IC 12 executes a predetermined range finding sequence to activate the LED driver 11, in accordance with a command from a microcomputer 14. The autofocus IC 12 amplifies signals from the output terminals 9a and 9b of the PSD 9, samples and holds them, and supplies them to the microcomputer 14. The microcomputer 14 calculates first and second channel signals supplied via the output terminals 9a and 9b to obtain distance data. In accordance with the distance data calculated by the microcomputer 14, the setting position of the taking lens 5 is determined.

The microcomputer 14 is of a general purpose type and controls the autofocus IC 12, taking lens position controller 15, exposure control IC 16, film transport control IC 17, and flash control IC 18. The taking lens position controller 15 receives driving pulses corresponding in number to distance data from the microcomputer, and drives a stepping motor 15a to move the taking lens 5 to the in-focus position. The exposure control IC 16 calculates an exposure time and aperture value for a proper exposure in accordance with the object brightness detected by a photometric element 16a and the film sensitivity, and controls a program shutter 20 by driving a stepping motor 16b.

After exposing a frame, a command is sent from the microcomputer 14 to the film transport control IC 17 to drive a film transport mechanism 21 and start transporting the film. The film transport amount is measured by counting the number of perforations. When the film transport amount corresponds to one frame (eight perforations), a stop command is supplied to the film transport control IC 17 to stop the film. The flash control IC 18 causes the flash device 22 to be driven when the exposure time calculated by the exposure control IC 16 is too long, so that a flash bulb 23 is energized in synchronism with the operation of the program shutter 20. When a power switch (not shown) of the camera is turned on, the flash control IC 18 continuously monitors the charge level of a main capacitor (not shown) of flash device 22, and if the level is lower than a predetermined level, the capacitor is automatically charged.

Figure 2:
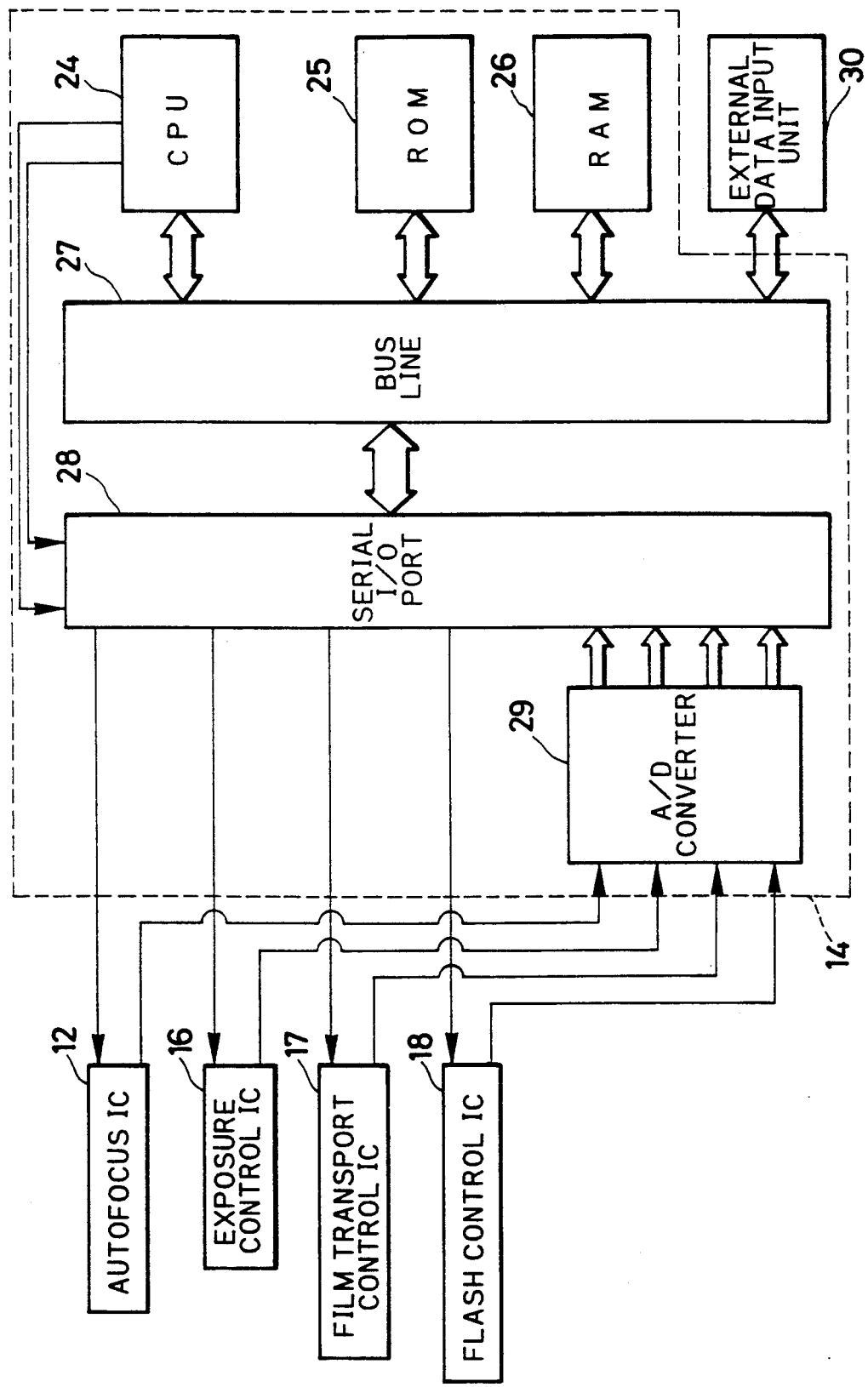
FIG. 2 is a block diagram showing the circuitry of a camera using the range finding device of this invention.

As shown in FIG. 2, the general-purpose microcomputer 14 comprises a CPU 24, a ROM 25, a RAM 26, a bus line 27, a serial I/O port 28, and an A/D converter 29. As is well known, the CPU 24 has various registers and an arithmetic and logical circuit, and executes a photographing sequence in accordance with sequence programs written into the ROM 25. The RAM 26 temporarily stores data obtained from the autofocus IC 12, the exposure control IC 16, the film transport IC 17, and the flash control IC 18 during the execution of the photographing sequence, as well as address data outputted while the sequence program is executed. The bus line 27 includes an address bus and data bus for data transfer of the CPU 24 to or from the ROM 25 and the RAM 26.

The serial I/O port 28 includes a parallel/serial converter circuit for converting command data outputted as parallel data from CPU 24 into serial data, which is then supplied to each IC. Analog data outputted from each IC are digitalized by the A/D converter 29 and supplied as parallel data having a predetermined number of bits to the serial I/O port 28 and to the bus line 27. An external data input unit 30 is used for transferring to the bus line 27 various signals generated upon actuation by an operator, such as a power-on signal, a shutter release signal or the like.

Figure 3:
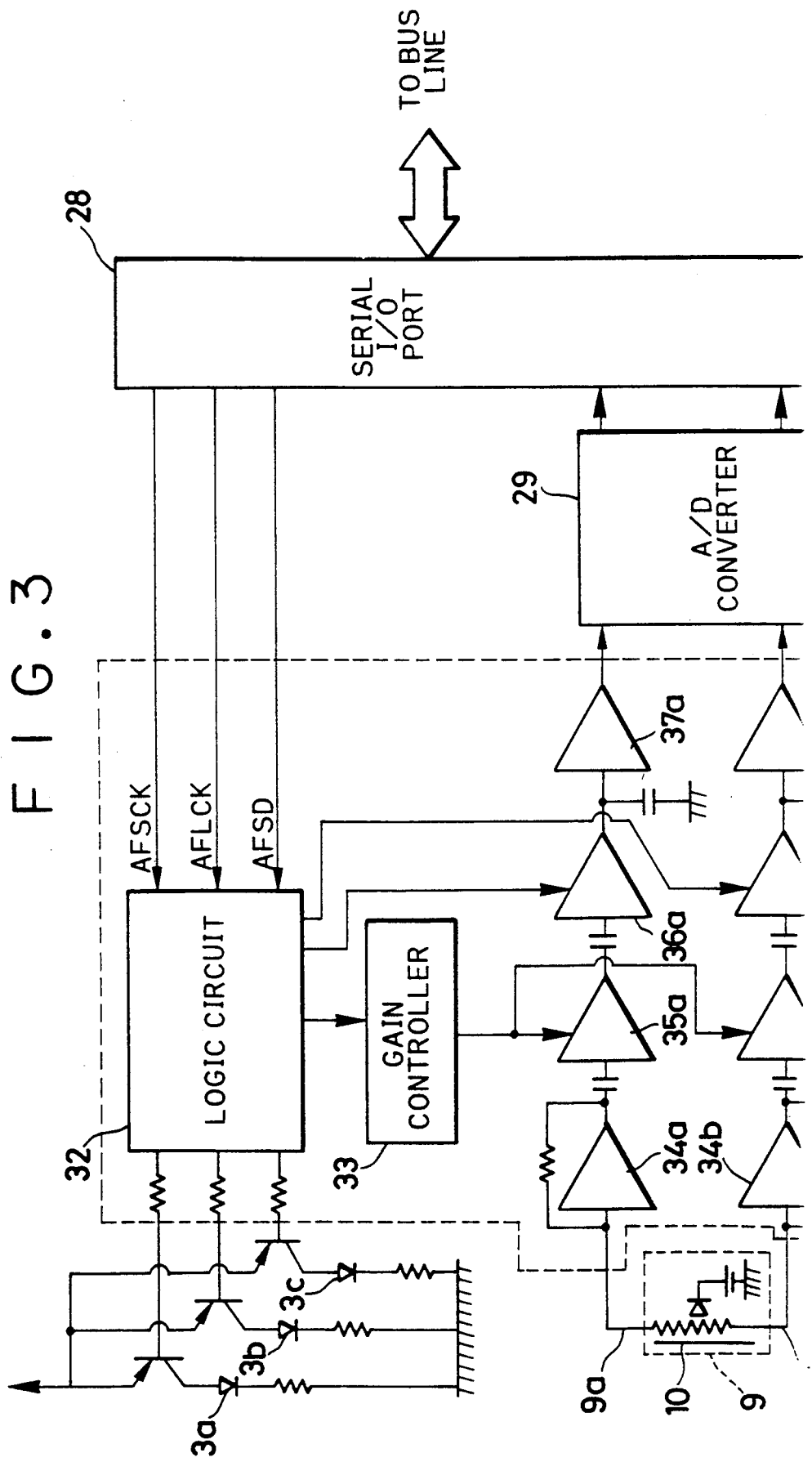
FIG. 3 is a block diagram showing the structure of the autofocus IC shown in FIG. 1.

Reference is made to FIG. 3 showing the outline of the autofocus IC 12. The autofocus IC 12 is a one-chip IC comprising a logic circuit 32, a gain controller 33, pre-amplifiers 34a and 34b for converting the first and second channel currents outputted from the output terminals 9a and 9b of the PSD 9, sample-hold circuits 36a and 36b, buffer amplifiers 37a and 37b, and other circuits.

Gain control amplifiers 35a and 35b are provided in consideration of the fact that if an object is at a far distance, the amount of the reflected light incident upon the PSD 9 becomes small and the absolute values of currents from the output terminals 9a and 9b become small. The gain of each gain control amplifier is set at an optimum value in accordance with the gain control process to be described later. The sample-hold circuits 36a and 36b sample and hold signals amplified by the gain control amplifiers 35a and 35b in response to sampling pulses from the logic circuit 32. The sample-hold signals are supplied via the buffer amplifiers 37a and 37b to the A/D converter 29 of the microcomputer 14. The logic circuit 32 basically comprises a shift register of a serial-in and parallel-out type. The gain controller 33 reads gain control data from the shift register at predetermined bit positions to set the gains of the gain control amplifiers 35a and 35b.

As described above, the serial I/O port 28 converts parallel command data from the CPU 24 into serial data pulses (AFSD) and supplies them to the logic circuit 32. The serial I/O port 28 also outputs transfer pulses (AFSCK) for transferring the serial data within the shift register, and control pulses (AFLCK) for use in latching parallel data from the shift register, and in determining gains and emission timings of the LEDs 3a to 3c. An analog signal outputted from the autofocus IC 12 is converted by the A/D converter 29 into a 7-bit digital signal (corresponding to 0 to 127 in binary) corresponding to the analog signal voltage level.

Figure 4:
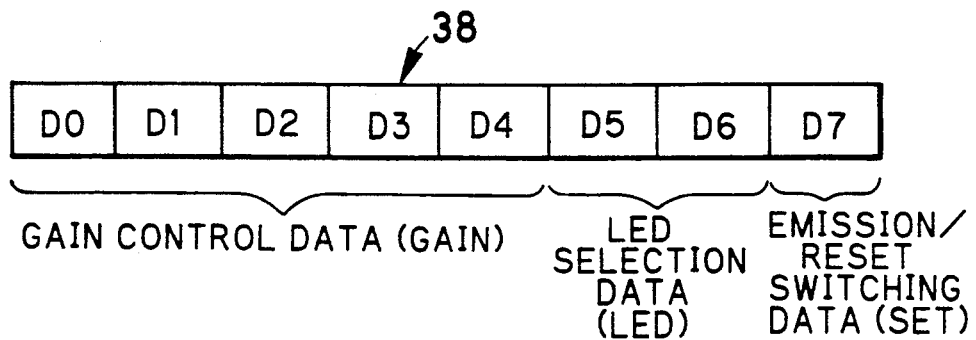
FIG. 4 conceptually shows a shift register used in the logic circuit shown in FIG. 3.

FIG. 4 conceptually shows the 8-bit serial-in and parallel-out shift register 38 used in the logic circuit 32. A gain control datum (GAIN) is allocated at the 5-bit field from "D0 to D4", an LED selection datum (LED) at the 2-bit field from "D5 to D6", and an emission/reset switching datum (SET) at the one-bit field of "D7". The 5-bit gain control datum can represent any gain level from "0" level to "31" level. The 2-bit LED selection datum can represent four states of "0" to "3" in decimal number. At "0", all the LEDs 3a to 3c are turned off; at "1" only the LED 3a is turned on; and at "2" and "3" the LEDs 3b and 3c are turned on respectively.

Figure 5:
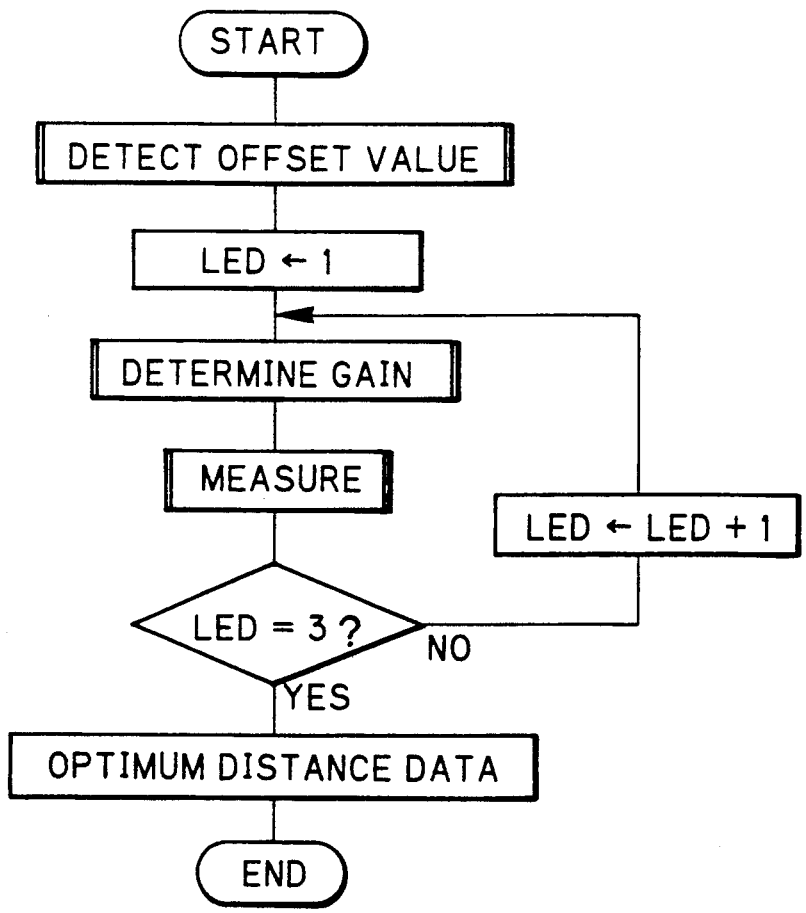
FIG. 5 is a flow chart showing the outline of a range finding sequence.

In the fundamental range finding sequence shown in FIG. 5, there are sequentially executed a process for detecting an offset value of an amplifier system of the autofocus IC 12; a process for measuring data from the LEDs 3a to 3c while sequentially driving the LEDs 3a to 3c; and a process for calculating a distance datum for each LED corresponding to an object distance in accordance with the measured data. Prior to the process of measuring data, a gain setting process is carried out for setting the gains of the gain control amplifiers 35a and 35b to optimum values.

Figure 6:
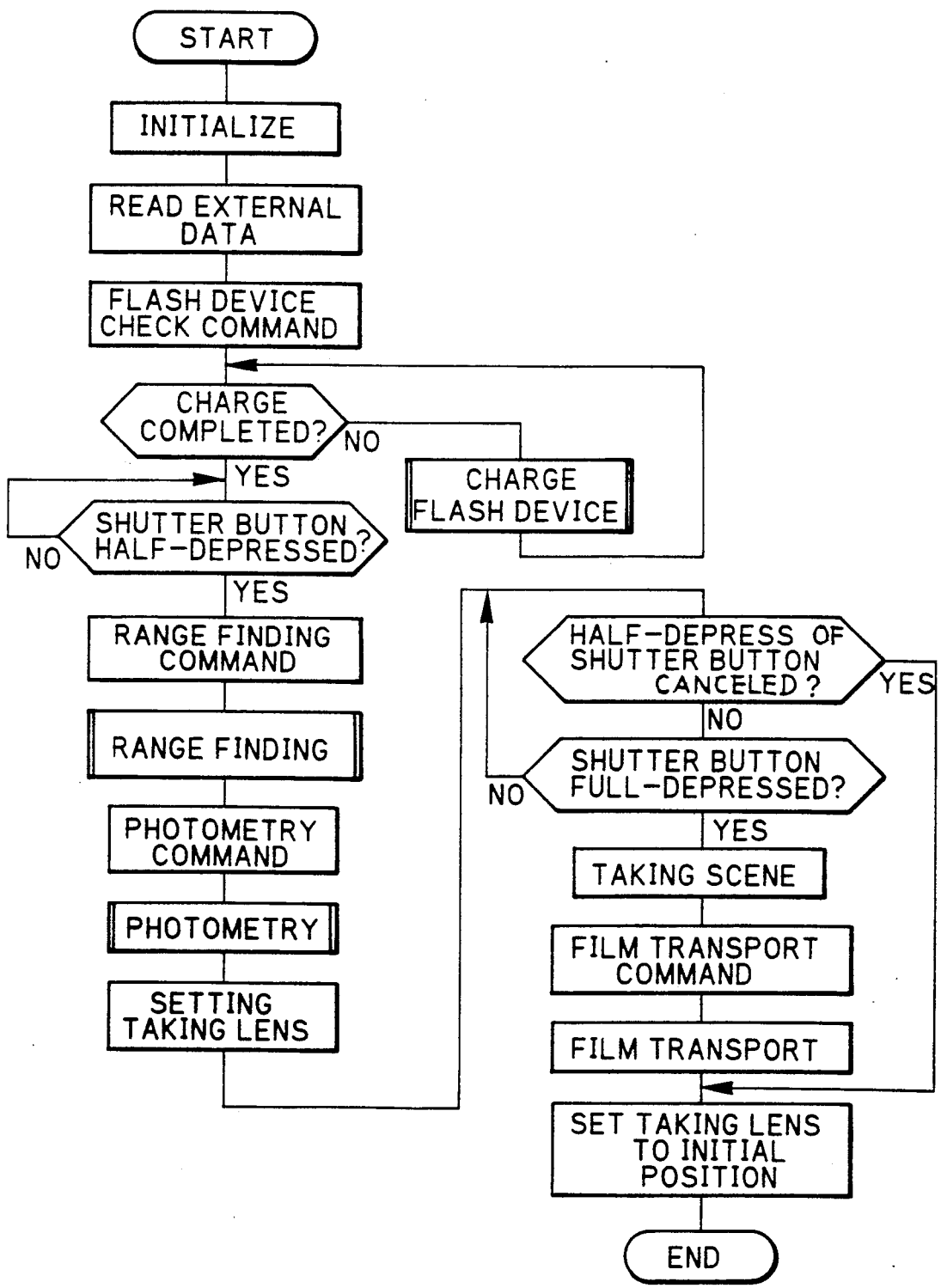
FIG. 6 is a flow chart showing a photographing sequence of a camera.

The operation of the embodiment constructed as above will be described with reference to FIGS. 6 to 13. As shown in FIG. 6, when the power-on switch (not shown) of the camera is turned on, data storage areas of RAM 26 are reset to the initial state, and thereafter data are read from the external data input unit 30. After confirming a photographing stand-by state such as completion of film loading, lens barrier opening or the like, a flash check command stored before hand in ROM 25 is supplied under control of the microcomputer 14 as a serial command datum to the flash control IC 18 via the bus line 27 and serial I/O port 28. Upon reading this command datum, the flash control IC 18 checks the charge level of the main capacitor of the flash device. If the charge level is insufficient, a charge process is executed. After charging is completed, a charge completion signal is sent to CPU 24 via the A/D converter 29 and the serial I/O port 28. After the main capacitor of the flash device is completely charged, the locked state of the shutter button (not shown) is released to allow depression of the shutter button.

The shutter button is depressed halfway after the camera is pointed in the direction of an object positioned within a target mark (not shown) displayed within the finder and extending horizontally thereof. A signal representative of the halfway depression of the shutter button is supplied from CPU 24 to the external data input unit 30. Then, CPU 24 outputs a range finding command to the autofocus IC 12 which in turn drives the light projector 2 to emit periodically a near-infrared spot beam of light and project it toward the object. The near-infrared light reflected from the object is detected with the light receiver 7 to measure the distance to the object.

After the above range finding operation, the CPU 24 sends a photometry command datum to the exposure control IC 16 to start measuring the object brightness. This command datum is a parallel multi-bit datum and contains film sensitivity information supplied from the external data input unit 30. This parallel command datum is converted into a serial command datum by the serial I/O port 28 in a similar manner as in the command transfer to the autofocus IC 12, so that the serial command datum is sent to the exposure control IC 16. In accordance with an object brightness signal detected by the photometric element 16 and a film sensitivity signal sent from the CPU 24, the exposure control IC 16 calculates the exposure time suitable for a proper exposure. The calculated analog exposure time datum is converted into a digital value by the A/D converter 29, is sent to the CPU 24 via the serial port 28 and the bus line 27, and is stored in the RAM 26.

After exposure calculation, under control of the CPU 24, clock pulses corresponding in number to a distance datum and stored in RAM 26 are sent to the lens position controller 15. Then, the stepping motor 15a is driven to move the taking lens 5 to an in-focus position corresponding to the distance datum. Next, when a full depression signal of the shutter button is supplied from the external data input unit 30 to the CPU 24, the program shutter 20 is operated in accordance with the exposure time obtained by the exposure calculation process to make an exposure. Specifically, the exposure time datum read from the RAM 26 is converted into the corresponding number of clock pulses by the CPU 24 so that serial clock pulses corresponding in number to the exposure time datum are supplied from the serial I/O port 28 to the exposure control IC 16. Then, the stepping motor 16b drives the program shutter 20 in accordance with the calculated exposure time.

After photographing, the CPU 24 sends a film transport command to the film transport control IC 17. The motor 17a is then driven to cause the film transport mechanism 21 to advance the film by one frame. During this film advance, the CPU 24 monitors the number of perforations in accordance with signals fed back from the film transport control IC 17. When the number of perforations reaches that corresponding to one frame the CPU 24 sends a stop command to the film transport control IC 17 to stop transporting the film. The film transport control IC 27 also sends via the A/D converter 29 to the CPU 24 a datum representative of the amount of current flowing through the motor 17a. Accordingly, when it becomes impossible to advance the film and when the load current of the motor 17a exceeds a predetermined value, the control automatically progresses to film rewinding. After advancing the film by one frame, the CPU 24 sends a reset signal to the lens position controller 15 to move the taking lens 5 to the initial position to complete one cycle of a photographic sequence.

Figure 7:
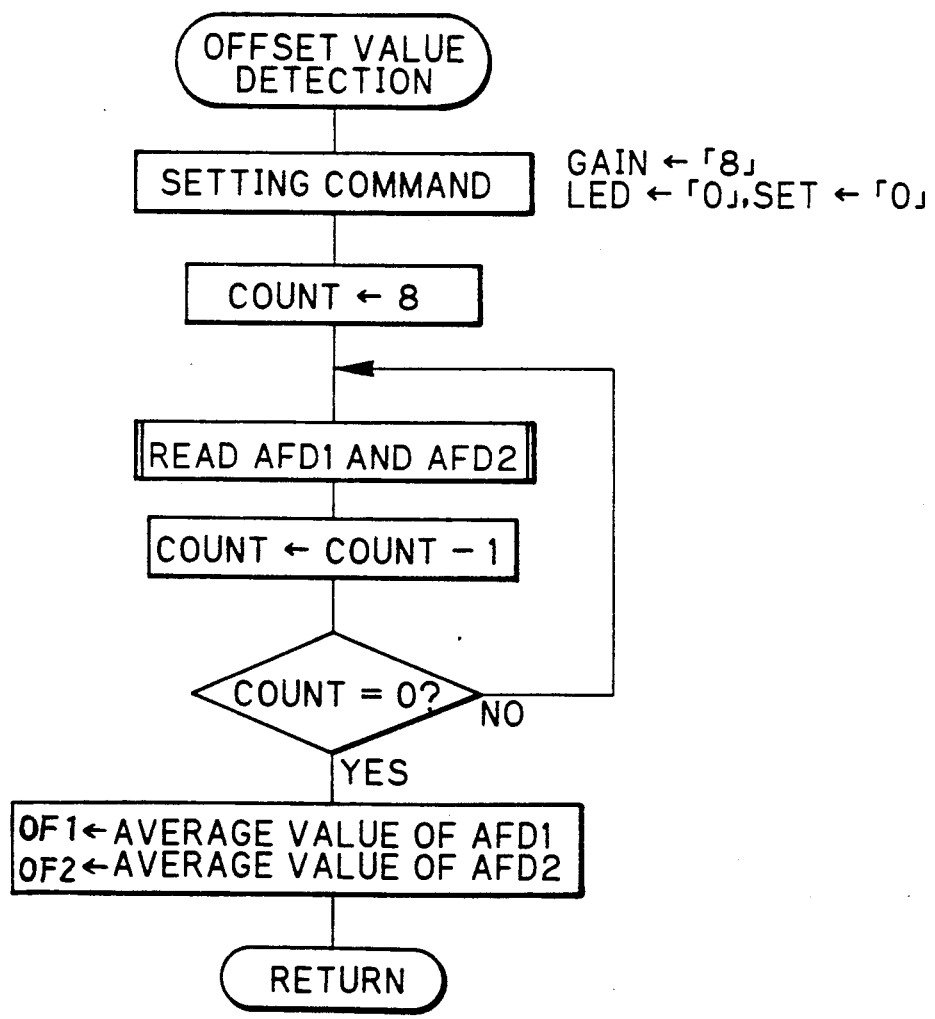
FIG. 7 is a flow chart illustrating the procedure of detecting an offset value.
Figure 8:
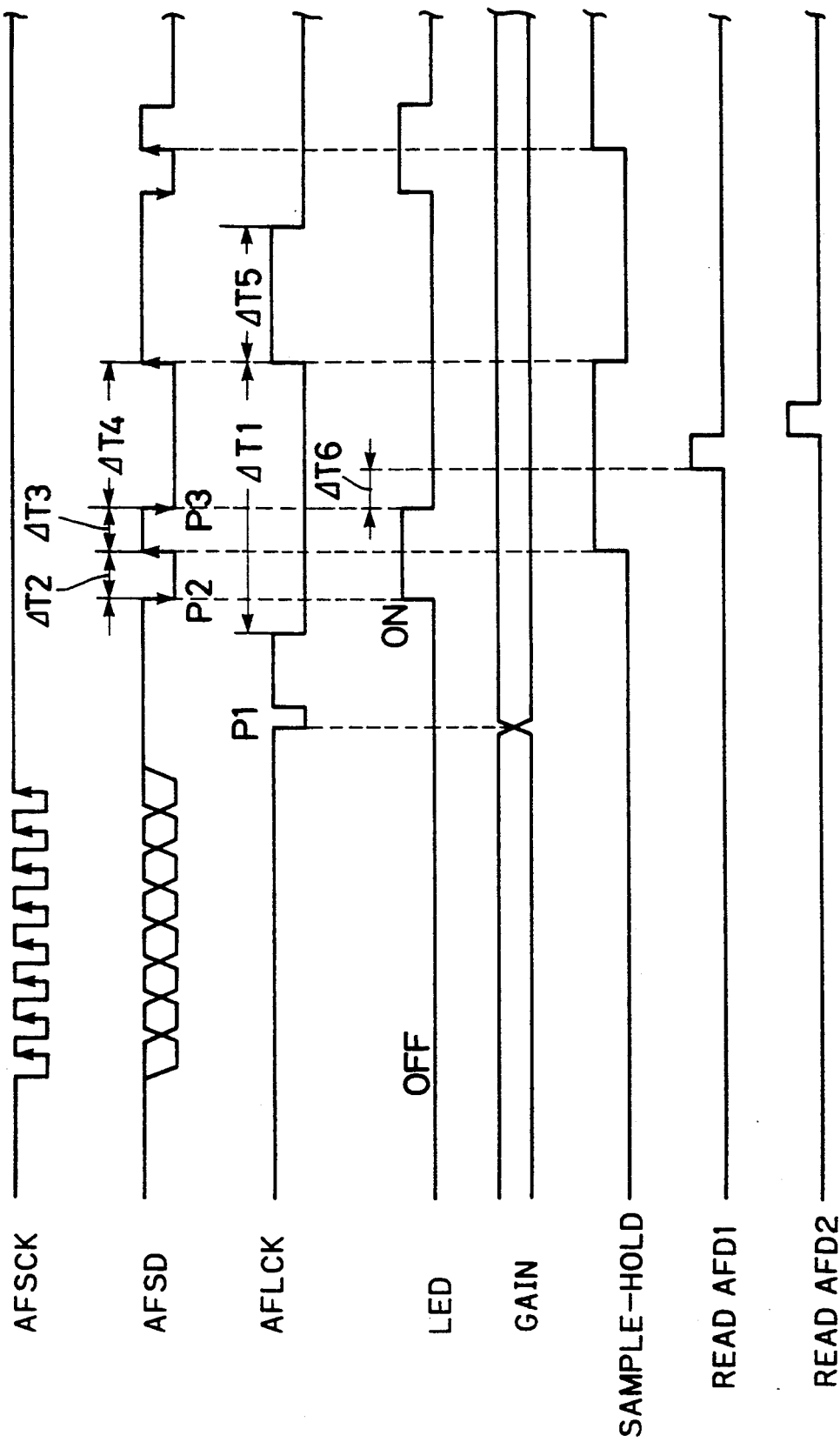
FIG. 8 is a timing chart showing timings of reading measured data.
Figure 9:
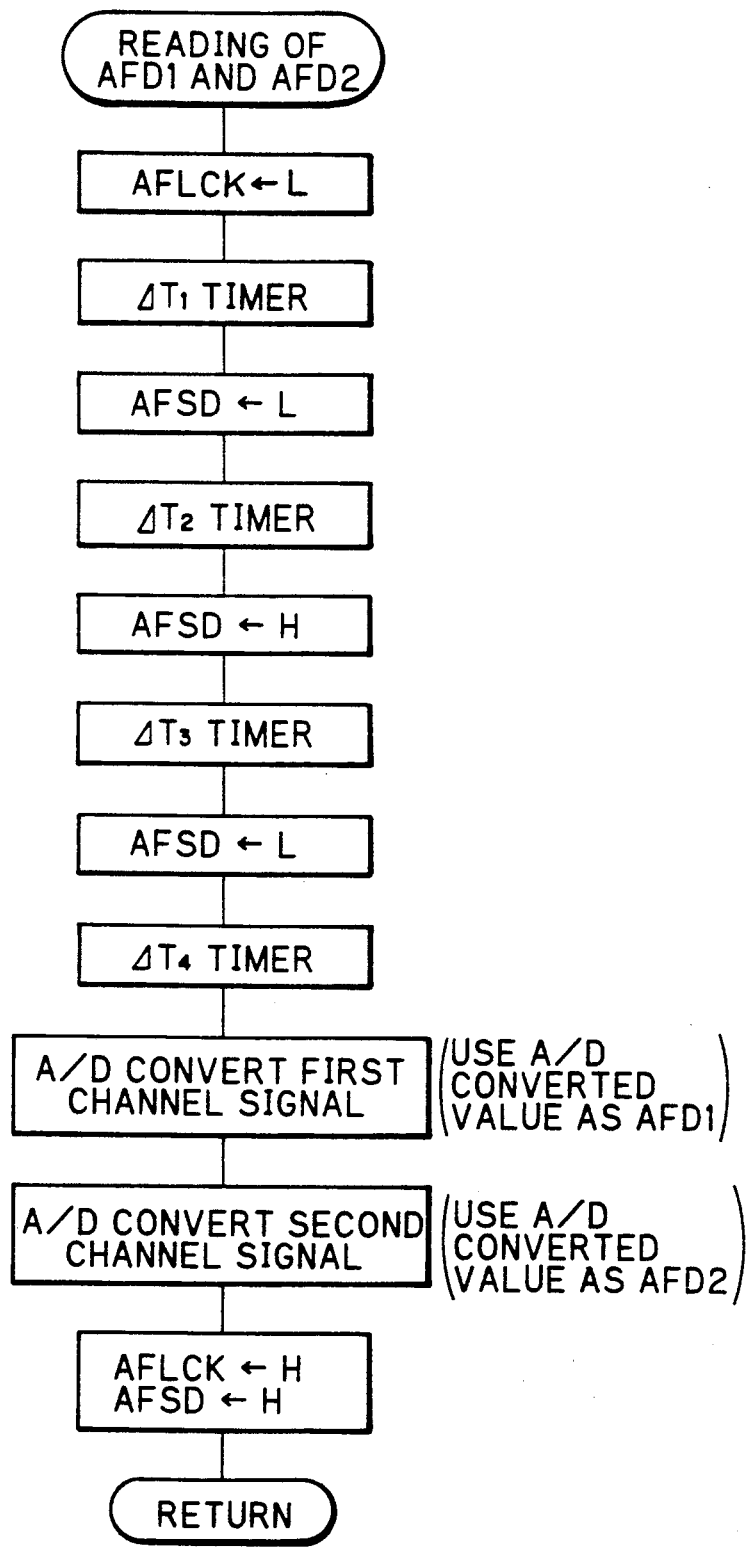
FIG. 9 is a flow chart illustrating the procedure of reading measured data.

Next, measuring object distance will be described in detail. At the start of the range finding sequence, the procedure of detecting an offset value is executed as shown in FIG. 7. For the offset value detecting procedure, "01000000" (binary value) is set in the shift register 38 at the bit positions of "D0 to D7". Command data for "GAIN = 8", "LED = 0" and "SET = 0" are set accordingly. The command data are latched in a latch circuit when the control pulse AFLCK reaches a low level at the same time P1 shown in the timing chart of FIG. 8, i.e., after eight transfer pulses AFSCK have been outputted and an 8-bit datum is set in the shift register. The serial data pulses are sequentially transferred to the shift register 38 at the rising edge of the transfer pulse AFSCK. After transferring the above command data, a data "COUNT = 8" is set in a predetermined register within the CPU 24.

Of the command data set in the shift register 38, the data "GAIN = 8" is supplied via the gain controller 33 to the gain control amplifiers 35a and 35b to set the gains thereof to "8". "GAIN 31" corresponds to the maximum amplification factor, and "GAIN 0" corresponds to the minimum amplification factor.

After transferring these serial data, output signals from the first and second channel are sampled and held, the A/D converted data AFD1 and AFD2 thereof being read into the microcomputer 14. In this data reading procedure shown by the flow chart of FIG. 9, the control pulse AFLCK is caused to be low during a period of ΔT1. At the time when the serial data pulse AFSD changes its level during this period, the LEDs 3a to 3c, the sample-hold circuits 36a and 36b and other circuits are controlled. The time P1 when AFSD becomes low level is used as the light emission time of the LEDs 3a to 3c. However, during the offset value detecting procedure, the command "LED =0" is valid so that none of the LEDs 3a to 3c is turned on.

After a time period ΔT2 from the time P2, the AFSD becomes high level. At this time the sample-hold circuits 36a and 36b hold the output signals from the gain control amplifiers 35a and 35b. The output signals have been amplified by the gain control amplifiers 35a and 35b at "GAIN 8". After the lapse of a further time period ΔT3, the AFSD becomes low level which is used as a light emission stop signal from the LEDs 3a to 3c, and then recovers a high level after the lapse of a time period ΔT4. The AFLCK takes again a high level after the lapse of the low level time period ΔT1. After this high level time period ΔT5, one cycle is completed.

After a time period ΔT6 from the time P3 when the AFSD becomes low level, the output signals held by the sample-old circuits 36a and 36b are supplied to the buffer amplifiers 37a and 37b and to the A/D converter 29 wherein they are converted into 7-bit digital signals which are stored in RAM 26 at predetermined addresses under the control of CPU 24 as the first and second channel measured data AFD1 and AFD2.

The reading of the measured data AFD1 and AFD2 is repeated eight times. Two sets of eight measured data for the first and second channels are averaged and used as offset values OF1 and OF2. The offset value detecting procedure is carried out while all the LEDs 3a to 3c are turned off, and the obtained offset values represent noises caused by ambient light incident upon the PSD 9, noises generated by signal processing systems following the pre-amplifiers 34a and 34b, and other noises.

After detecting the offset values, the procedure of determining gain and measuring object distance is carried out. The gain determining procedure is executed in accordance with the flow charts shown in FIGS. 10, 11 and 13. At the start of the gain determining procedure, flags "GFLAG" and "OVFLAG" in RAM 26 are set to an initial state "0". Thereafter, a serial datum representative of a new command is transferred from the serial port 28 to the logic circuit 32. Namely, a binary datum "01000011" is set in the shift register 38 at respective bit positions. Thus, there is provided a command of "GAIN =8", "LED =1" and "SET =1". In this condition, only the LED 3a is allowed to emit light.

After setting the above new command, similar to the operation of the offset value detecting procedure, measured data AFD1 and AFD2 are read. In this case, as seen from the timing chart of FIG. 8, the LED 3a is turned on during the time period "ΔT2+ΔT3". In this case, pulsed light from the LED 3a as shown in FIG. 1 is applied to the main object S1, and the reflected light falls on the PSD 9 via the light receiving lens 8. Signals outputted from the terminals 9a and 9b of the PSD 9 contain information regarding the intensity and position of light incident upon the PSD 9.

After the two channel signals are converted into digital signals and read as the measured data AFDI and AFD2, it is judged whether their values reach a decimal number "127". If the value AFDI or AFD2 reaches "127", it means that the corresponding measured data have overflowed and that the amount of light incident upon the PSD 9 is large. Accordingly, the measured data are considered to be unreliable. In this case, therefore, after confirming "GAIN=8", a procedure of "AFRESULTa" ←127" to be described later is carried out. This case corresponds to one in which an object at the central area of a scene is at a near position and the reflected light is thus too bright even at a relatively low gain of "GAIN =8". It is possible to change the "GAIN" value to lower than "8". The minimum gain is variable depending on the type and dimension of the camera with which the invention is to be used, as well as on the intensity of light from the LED used.

If there is no overflow of the measured data AFD1 additive datum AFADD and a subtractive datum AFDIF by adding the measured datum AFD1 to AFD2 and by subtracting the measured datum AFD2 from AFDI, respectively, as shown in FIG. 11. In this calculation, in order to remove noise components, offset values OF1 and OF2 are subtracted from the measured data AFD1 and AFD2, respectively. It is then checked whether the additive datum AFADD has a value equal to or greater than "136". If the value is equal to or larger than "136", it is judged that the absolute values of the measured data AFD1 and AFD2 are within a range suitable for the succeeding range finding calculation, and the current "GAIN" value is decided as the gain of the gain amplifiers 35a and 35b at that time. In this condition, the range finding procedure for the LED 3a continues.

On the other hand, if the additive measured datum AFADD has a value less than "136", after confirming that the flag "GFLAG" is not "1", which is representative of an improper "GAIN" value, a factor "N" is added to the "GAIN" value in order to increase the absolute values of the measured data AFD1 and AFD2. The value "N" is defined in accordance with the value of the additive measured datum AFADD as in the following table:

| AFADD | 98 or more | 97 to 70 | 69 to 50 | 49 to 36 |
|-------|------------|----------|----------|----------|
| N     | +1         | +2       | +3       | +4       |
| AFADD | 35 to 26   | 25 to 19 | 18 to 14 | 13 or less |
| N     | +5         | +6       | +7       | +8       |

For the purpose of changing the "GAIN" value, a new command is set. In this case, the data in the shift register only at the bit positions "D0 to D3" are changed, and the other data are maintained unchanged. In accordance with the new "GAIN" value, the gain controller 33 sets the gains of the gain control amplifiers 35a and 35b, and similar operations as above are repeated thereafter. During this repeated process, it may happen that an overflow occurs at "GAIN>8". In this case, "GFLAG" is set at "1" and the "GAIN" value is decreased by "1".

If even at the "GAIN" value of the maximum gain "31" there is not obtained an additive datum AFADD having a proper absolute value, this means that the light reflected from an object is extremely weak or that no such light reached the PSD 9. The latter case corresponds to one in which the object is at a very great distance. In such cases, the procedure "AFRESULTa←0" is executed.

After the "GAIN" value is determined by the above-described procedure, the gain control amplifiers 35a and 35b are set to that value to further execute the range finding procedure for the LED 3a. The range finding procedure is shown in FIGS. 12 and 13. In this range finding procedure, the LED 3a is turned on eighteen times, and each time, the measured data AFD1 and AFD2 are read in. Each time when the measured data AFD1 and AFD2 are read in, a check is performed to determine whether they overflowed or whether their absolute values are less than "15", below which the data values are insufficient for the succeeding range finding operation. If it is judged that the measured data AFD1 and AFD2 are improper, a count "OVCOUNT" is increased by "1".

When the count "OVCOUNT" reaches "4", it is judged that the "GAIN value determined by the gain determining to "1" and the "GAIN" value is reduced by "1" to again perform range finding from the initial condition. In order to prevent the range finding from being repeated too many times, if the count "OVCOUNT" again reaches "4" after the flag "OVFLAG" is once set to "1", then the value of "AFRESULTa" is determined as "M" as defined by the "GAIN" value at that time. In determining the value "M", the following table is referred to:

| GAIN | 31 | 30 | 29 to 27 | 26 to 25 | 24 or less |
|---|---|---|---|---|---|
| M | 0 | 10 | 21 | 25 | 35 |

During the procedure of reading the measured data AFD1 and AFD2 18 times, the minimum values "MIN1" and "MIN2" and maximum values "MAX1" and "MAX2" for the two channels are checked, and the measured values AFD1 and AFD2 are accumulated for each channel as "SUM1" and "SUM2". The maximum and minimum values of AFD1 and AFD2 are subtracted from the sum values "SUM1" and "SUM2", respectively, and thereafter the average values are calculated. Assuming that the count value "OVCOUNT" is set to X (equal to or smaller than 3), the number of measurements is "16−X". The sum values "SUM1" and "SUM2" may be divided by the number of measurements "16". In this embodiment, in order to obtain a reliable average value, the maximum and minimum values are subtracted from the sum values. However, this subtraction may be omitted. In this case, the number of measurements becomes "18" by which the sum values may be divided.

The obtained average values for respective channels are subjected to correction by the offset values in accordance with the procedure shown in FIG. 11, and thereafter they are transformed into the additive data AFADD and subtractive data AFDIF. The ratio of these data is multiplied by "128" to obtain "AFRESULTa", whereupon the range finding procedure for the LED 3a is completed.

Next, the LED 3b is activated to carry out the gain determining and range finding procedures, and then the LED 3c is activated to carry out the same procedures, thereby to obtain the values of "AFRESULTb" and "AFRESULTc", respectively.

The values of "AFRESULT" are the object distance data for three LEDs 3a to 3c. In the scene shown in FIG. 1, the "AFRESULTa" corresponds to the distance to the main object S1, the "AFRESULTb" corresponds to the distance to the background object S2, and "AFRESULTc" is "0" (refer to FIG. 10) because a pulsed light beam is not reflected. In accordance with a program stored in ROM 25, the microcomputer 14 determines as an optimum distance datum the value representing the nearest object distance among the values "AFRESULTa", "AFRESULTb", and "AFRESULTc". At this stage, the range finding sequence is completed. If the measured data AFD1 and AFD2 overflow, the value of "AFRESULT" is "127" which corresponds to the nearest object distance. However, this particular value is not taken into account in determining an optimum distance datum. After determining an optimum distance datum in the above manner, the lens position controller 58 drives the stepping motor 60 to set the taking lens 5 to the lens position corresponding to the distance datum.

Figure 14:
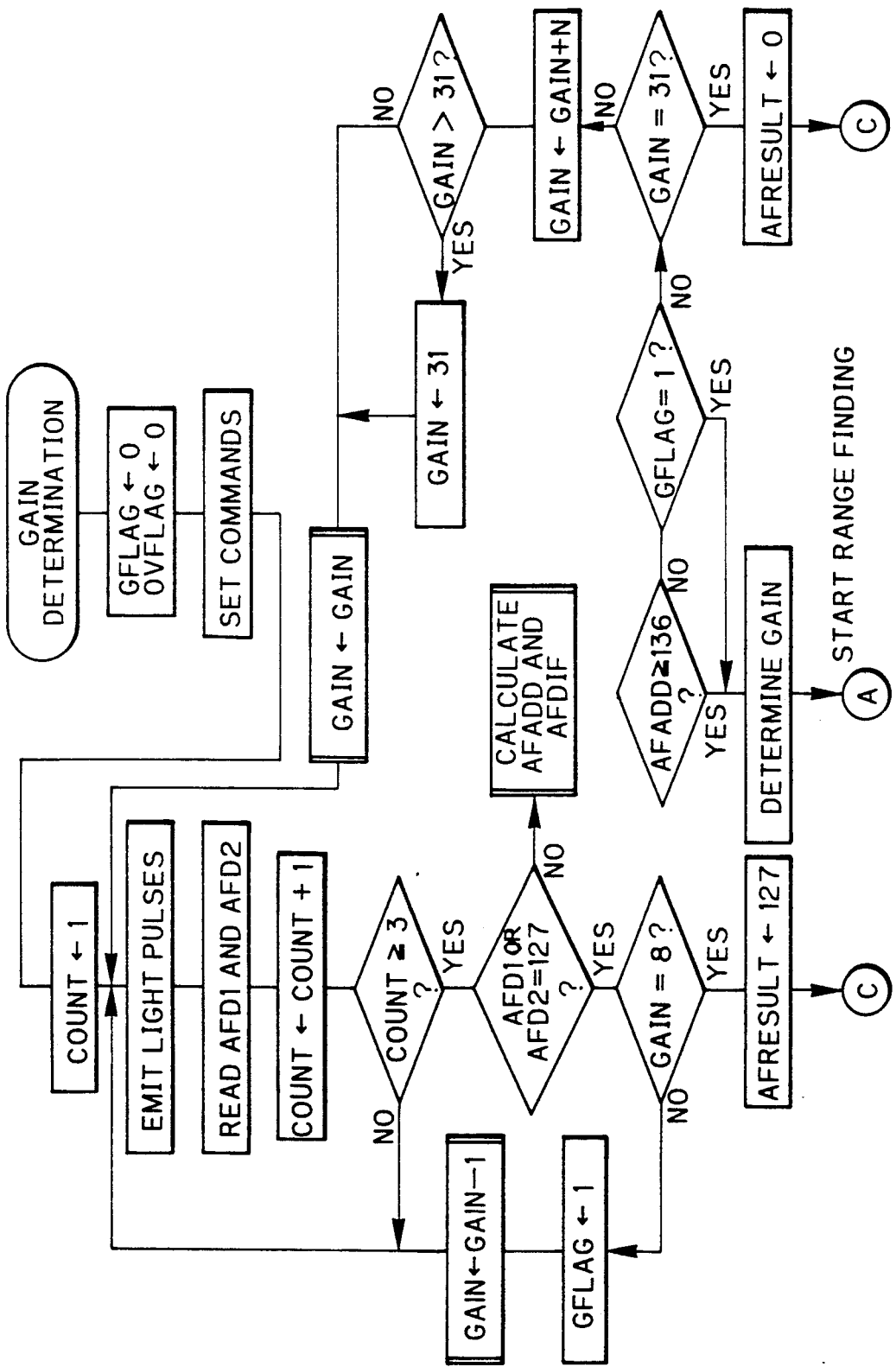
FIG. 14 is a flow chart similar to FIG. 10, illustrating the procedure of determining a gain after an LED emission becomes stable.

Immediately after the start of driving the LEDs 3a to 3c, the operation thereof is not stable, and so the amount of emitted light fluctuates. It is therefore preferable to pick up signals from the PSD 9 and use them for range finding calculation after the amount of light emitted by the LEDs 3a to 3c becomes stable. In the embodiment shown in FIG. 14, the fourth and following pulsed light beams are considered valid and are used in determining gain. The other structure of this embodiment is the same as that shown in FIG. 11 except that the first to third pulsed light beams are invalidated. In the case wherein gain control is not conducted and the output signals from the PSD 9 are amplified by a constant amplification factor, the measured data obtained from the first three pulsed light beams after the start of range finding are invalidated. The number of pulsed light beams to be invalidated may be set as desired depending upon the start-up characteristics of the LEDs.

In the above embodiment, the autofocus IC 12 amplifies the two channel signals from the PSD 9 and outputs them as analog signals. Therefore, output signals having a proper level can be obtained from the gain control amplifiers having a linear amplifying characteristic without degrading the S/N ratio. The obtained two channel signals are converted into digital signals and supplied to the microcomputer 14 wherein a digital division operation is executed so that an additional circuit for performing a division operation is not required and correct distance data can be obtained.

For cameras which control the operation of the exposure control IC 16 and the film transport IC 17 by using a general purpose microcomputer 14, a portion of the processes necessary for autofocussing can be executed by the microcomputer 14 by making the autofocus IC 12 controllable by a serial data command. In addition, the serial I/O port 28 for the interface between the microcomputer 14 and the exposure control IC 16 and film transport IC 17 can be used as the interface between the microcomputer 14 and the autofocus IC 12. Furthermore, as in the case of the data obtained by the exposure control IC 16 and the film transport IC 17, the data measured by the autofocus IC 12 can be processed by the microcomputer 14. It is therefore possible to deal with a change or improvement of range finding calculation or the like by changing corresponding programs of the microcomputer 14 without changing the autofocus IC 12. It is obvious that the procedures of photographing sequence and range finding sequence may be changed as desired.

In the above embodiments, three LEDs are used and three distances in the lateral direction of a photographic scene are measured in order to allow correct range finding even if an object is not present at the center of the scene. The present invention is also applicable to range finding devices using one, two, four or more LEDs. If a single LED is used, instead of a spot beam an elongated line of light may be emitted or a single spot beam of light may be moved to scan a photographic scene. It is also possible to drive the LEDs seriatim to emit single pulsed light beams one at a time such that each LED emits a predetermined number of pulsed light beams at regular intervals. The posture of the light projector 2 may be changed with the camera posture in order to emit a plurality of spot beams of light parallel to the surface of the ground. The light projector 2 and the light receiver 7 may be disposed horizontally in the camera body. As a light receiving element, not only PSDs but also CCD image sensors or the like may be used. As a light source, a flash tube, a lamp or the like may be used. The range finding device may be controlled by logic circuits other than a microcomputer. In the above embodiments, the range finding device is used with optical cameras, but the present invention is also applicable to electronic still cameras.

While the invention has been described in detail above with reference to preferred embodiments, various changes and modifications within the scope and spirit of the invention will be apparent to people skilled in this technological field. Thus, the invention should be considered as being limited only by the scope of the appended claims.

What is claimed is:

1. A stabilized range finding device for an electronically controlled camera of the type having light projector means for projecting light toward an object to be photographed, light receiver means for receiving light reflected from the object and for outputting two channel signals changing in accordance with the intensity and incident position of the reflected light, and calculating means for calculating a distance datum on the basis of the two channel signals, the range finding device comprising:
   (a) a plurality of light emitting diodes as said light projecting means, each driven during sequential intervals to project emitted light toward different areas of said object and each driven to emit a first predetermined number of times during its driven interval;
   (b)O a position sensitive detector included within said light receiver means for outputting said two channel signals;
   (c) a microcomputer as said calculating means for executing a photographic image taking sequence;
   (d) means for linearly amplifying said tow channel signals and for outputting said two channel signals as analog signals;
   (e) means for A/D converting said two channel analog signals into digital signals and for sending said digital signals for respective channels to said calculating means; and
   (f) stabilizing means controlled by said calculating means for invalidating said digital signals produced prior to a second lesser predetermined number of times.

2. A stabilized range finding device according to claim 1, wherein said amplifying means includes two pre-amplifiers for converting said channels signals from said position sensitive detector into corresponding voltage signals, and two gain control amplifiers for respectively amplifying said voltage signals.

3. A stabilized range finding device according to claim 1, wherein said calculating means obtains a valid plurality of distance data one for each said light emitting diodes and selects an optimum one of said valid plurality of distance data, said valid plurality being the difference between said first predetermined number and said second predetermined number of times.

4. A stabilized range finding device according to claim 3, wherein each of said light emitting diodes emits near-infrared light during its driven interval and said calculating means calculates said distance datum in accordance with an average value of a valid plurality of said digital signals obtained for each of said light emitting didoes.

5. A stabilized range finding device according to claim 4, wherein the number of said plurality of light emitting diodes is three, sand said first predetermined number is eighteen and said second predetermined number is four.

6. A stabilized range finding device according of claim 2, further comprising gain calculating means for calculating a new gain value depending upon a correlation between a said digital signal outputted from said A/D converting means and the existing gain value of said gain control amplifier, and gain setting means for setting said new gain value into said gain control amplifier.

7. A stabilized range finding device according to claim 2, further comprising gain adjustment means for adjusting the gain value of said gain control amplifier within a predetermined gain adjusting range, and means for determining, when the output signal from said gain control amplifier cannot be held within a predetermined output range at a gain value within said predetermined gain adjusting range, a said distance datum in accordance with the existing gain value.

8. A stabilized range finding device according to claim 2, further comprising:
   gain adjusting means for adjusting the gain value of said gain control amplifier prior to the start of range finding so as to make the output signal from said gain control amplifier fall within a predetermined output range
   means for conducing rang finding a plurality of times a the gain value determined by said gain adjusting means and for obtaining an average value of a plurally of output signals from said gain control amplifier and for sending said average value to said calculating means for calculating a said distance datum;
   means for counting the number of said output signal having a value outside f said predetermined output range by monitoring the output signals form said gain control amplifier obtained by said plurality of range findings; and
   means for interrupting the gain adjusting of said gain adjusting means and for allowing to continue range finding if the count of said counting means is equal to or less than a predetermined value.

9. A stabilized range finding device according to claim 8, further comprising means for conducting range finding a plurality of times after again adjusting the gain value of said gain control amplifier if the count of said counting means excess said predetermined value and for interrupting range findings when the count of said counting means gains reaches said predetermined value and for then determining a said distance datum specific to the existing gain value.

10. A stabilized range finding device according of claim 1, further comprising a memory for storing as an offset correction value a digital signal outputted form said A/D converting means while said light projecting means is inactive, and offset correcting means for making an offset correction by subtracting said offset correction value form as digital signal outputted from said A/D converting means while said light projecting means is active.

11. A stabilized range finding device according of claim 10, further comprising means for obtaining an average value of a plurality of said digital signals while said light projector means is inactive and for using said average value as said offset correction value.

12. A stabilized range finding device for an electronically controlled camera, comprising:
- a light emitting element for projecting pulsed light a first predetermined number of times toward an object to be photographed;
- a light receiving element for receiving pulsed light reflected from said object and for outputting a signal corresponding of the intensity and incident position of said reflected pulsed light;
- calculating means for calculating a distance datum to be used for focusing said camera in accordance with said signal from said light receiving element; and
- control means for invalidating said signal obtained from said light receiving element that is produced prior to a second lesser predetermined number of times.

* * * * *